Jan. 15, 1929.

F. L. FULLER ET AL 1,699,060

CASH REGISTER

Original Filed July 9, 1920   7 Sheets-Sheet 1

Inventors
Frederick L. Fuller &
William H. Robertson
BY
THEIR

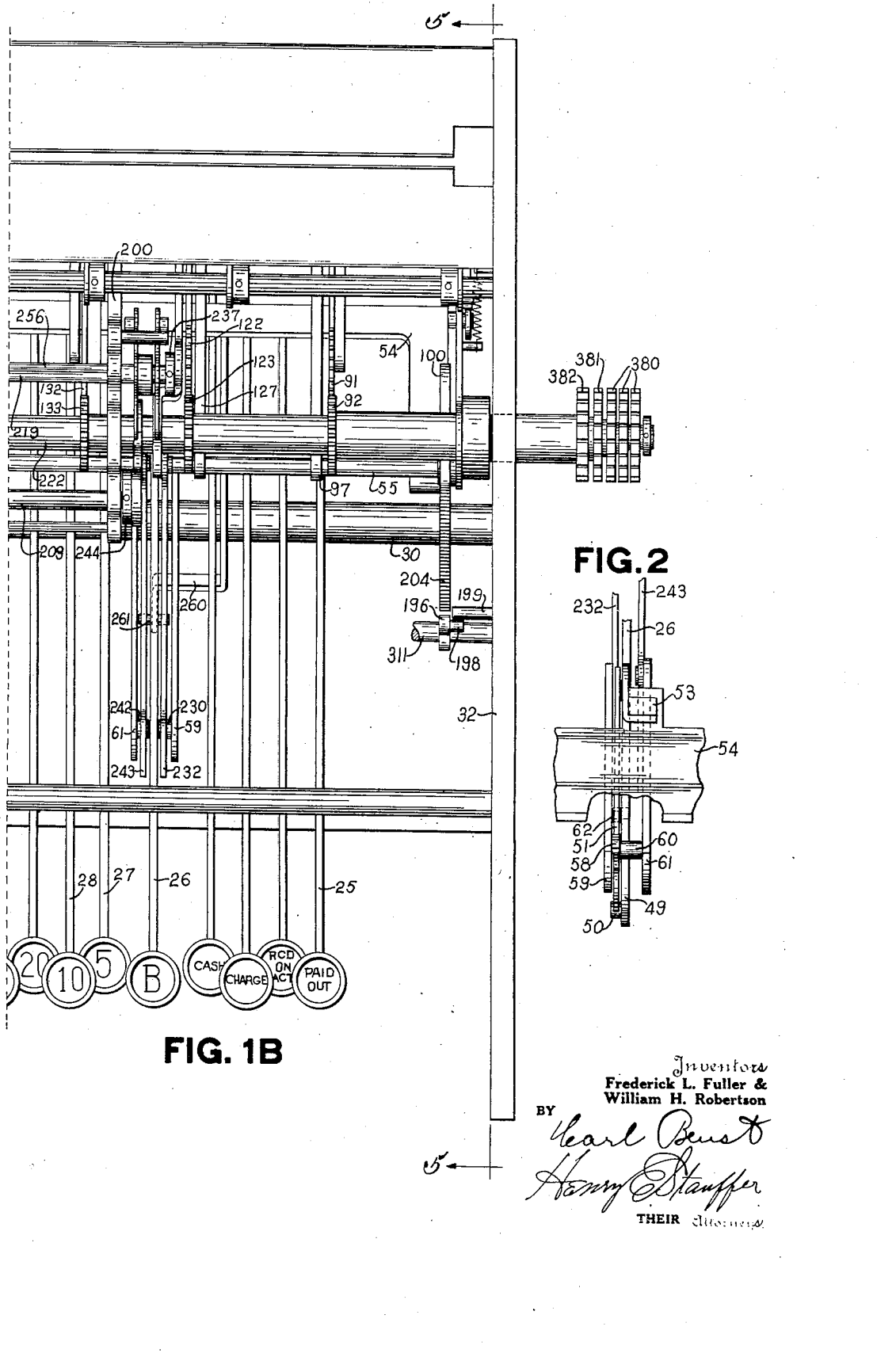

Jan. 15, 1929.  F. L. FULLER ET AL  1,699,060
CASH REGISTER
Original Filed July 9, 1920    7 Sheets-Sheet 3

Inventors
Frederick L. Fuller &
William H. Robertson
BY
THEIR Attorneys

Jan. 15, 1929.
F. L. FULLER ET AL
1,699,060
CASH REGISTER
Original Filed July 9, 1920  7 Sheets-Sheet 4
FIG. 7
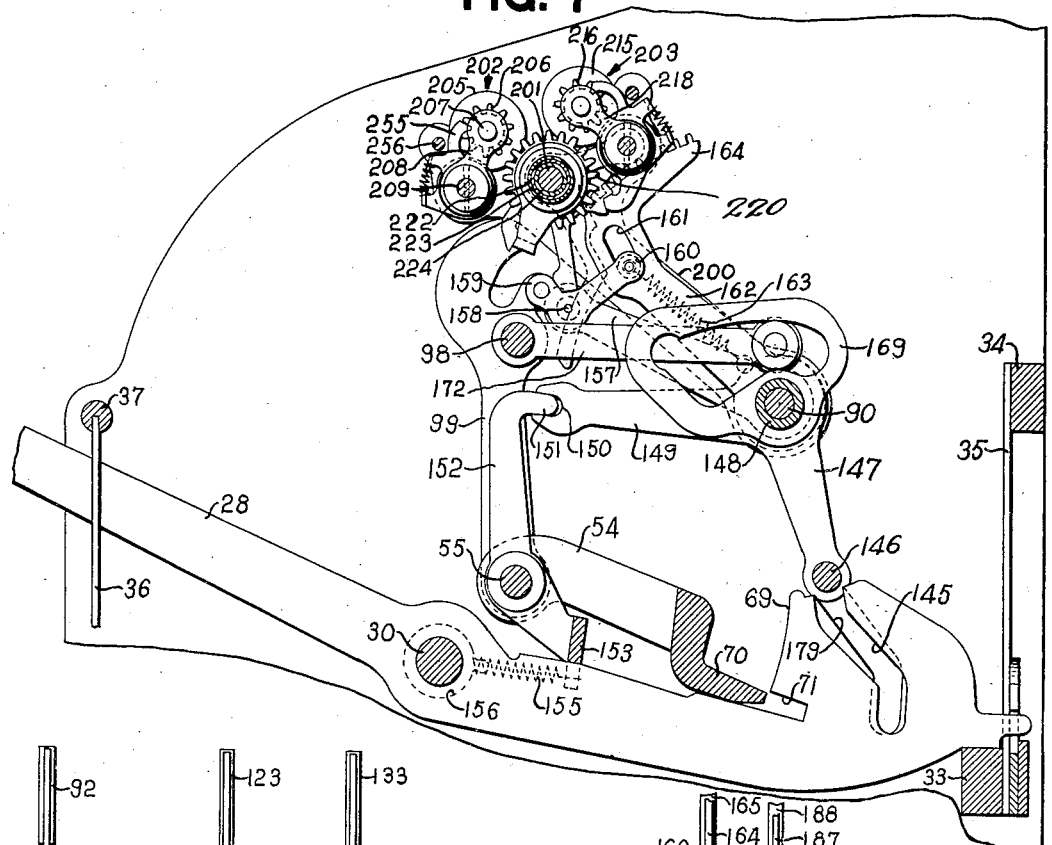
FIG. 8
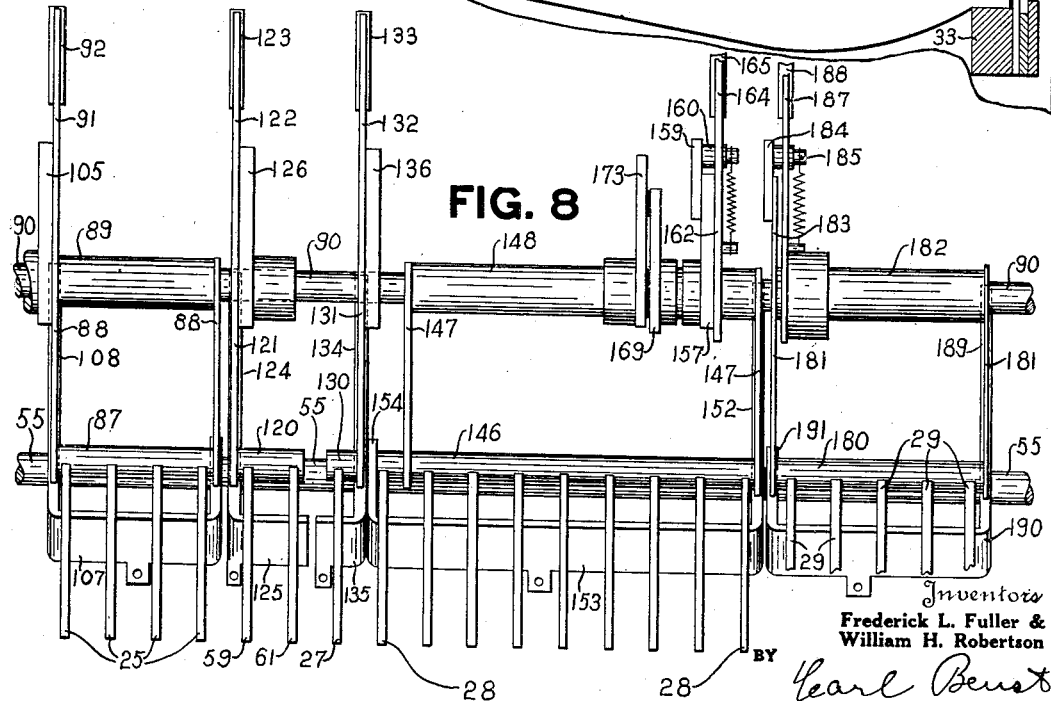
Inventors
Frederick L. Fuller &
William H. Robertson
BY
THEIR Attorneys Jan. 15, 1929.

F. L. FULLER ET AL 1,699,060

CASH REGISTER

Original Filed July 9, 1920      7 Sheets-Sheet 5

Inventors
Frederick L. Fuller &
William H. Robertson
BY Carl Beust
Henry E. Stauffer
THEIR Attorneys Jan. 15, 1929.  1,699,060
F. L. FULLER ET AL
CASH REGISTER
Original Filed July 9, 1920   7 Sheets-Sheet 6
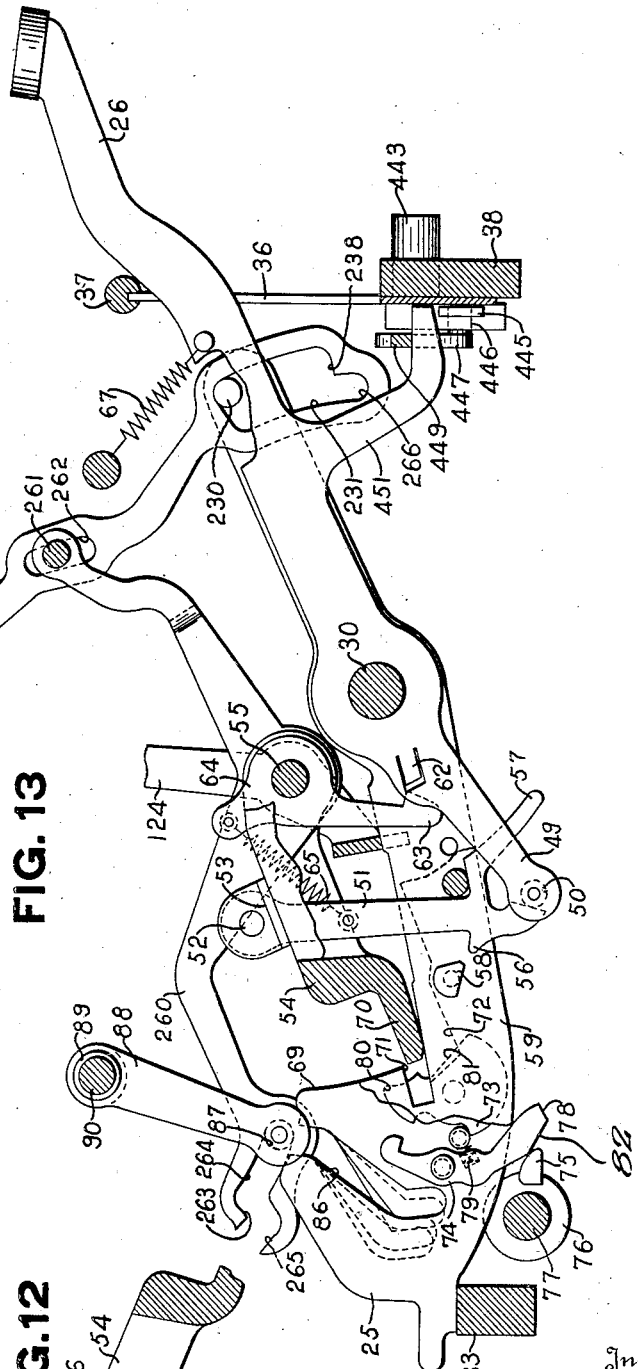
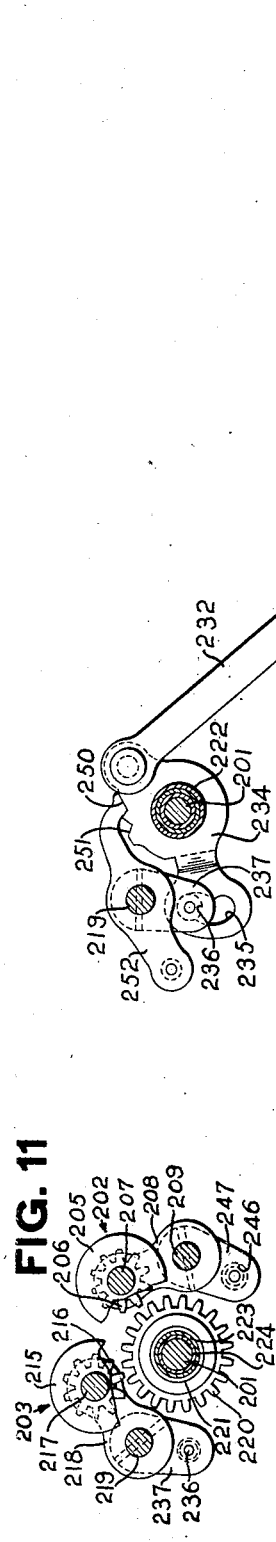
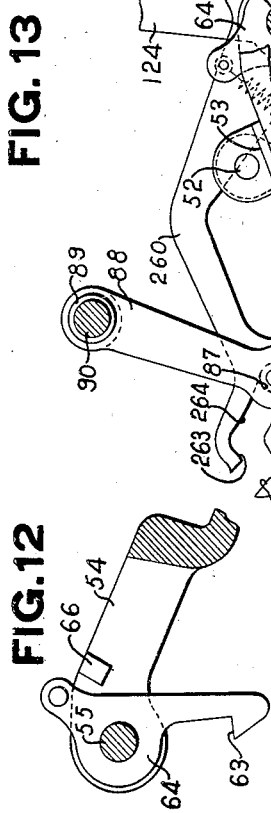
Inventors
Frederick L. Fuller &
William H. Robertson
BY Carl Beust
Henry C. Stauffer
THEIR Attorneys Patented Jan. 15, 1929.

1,699,060

UNITED STATES PATENT OFFICE.

FREDERICK L. FULLER, OF ILION, NEW YORK, AND WILLIAM H. ROBERTSON, OF DAYTON, OHIO, ASSIGNORS TO THE NATIONAL CASH REGISTER COMPANY, OF DAYTON, OHIO, A CORPORATION OF MARYLAND.

CASH REGISTER.

Original application filed July 9, 1920, Serial No. 394,974. Divided and this application filed January 5, 1927. Serial No. 159,126.

This is a division of the application for Letters Patent of the United States, of Frederick L. Fuller and William H. Robertson, Serial Number 394,974, filed July 9, 1920, which matured into Letters Patent, No. 1,619,664, on March 1, 1927.

An object of this invention is to provide an improved totalizer actuating mechanism in machines known as the key-operated type.

Another object is to make such actuating mechanism function in connection with a plurality of totalizers.

Another object is to provide an improved totalizer selecting mechanism whereby the desired totalizer may be actuated by the common actuating mechanism.

Another object is to provide an improved totalizer engaging and disengaging mechanism for machines of the key-operated type.

With these and incidental objects in view, the invention consists in certain novel features of construction and combination of parts, the essential elements of which are set forth in appended claims, and a preferred form of embodiment of which is hereinafter described, with reference to the drawings which accompany and form part of the specification.

Of said drawings:—

Figs. 1<sup>A</sup> and 1<sup>B</sup> together constitute a top-plan view of the improved key-operated machine, the cabinet therefor being removed.

Fig. 2 is a fragmentary rear view showing the control of the clerk's initial key lever.

Fig. 7 is a sectional view on line 7—7 of Fig. 1<sup>A</sup> looking in the direction of the arrow.

Fig. 8 is a rear elevation of part of the actuating mechanism and the key levers.

Fig. 11 illustrates the normal position of the totalizers relative to the actuator.

Fig. 12 illustrates the retaining means for the B lever, the release for said means and a portion of the key coupler.

Fig. 13 illustrates the means for rocking B's totalizer into mesh with the actuator; the rear ends of the transaction keys and their control of said totalizer engaging means; and a portion of the clerk's key locking device.

Figure 1A:
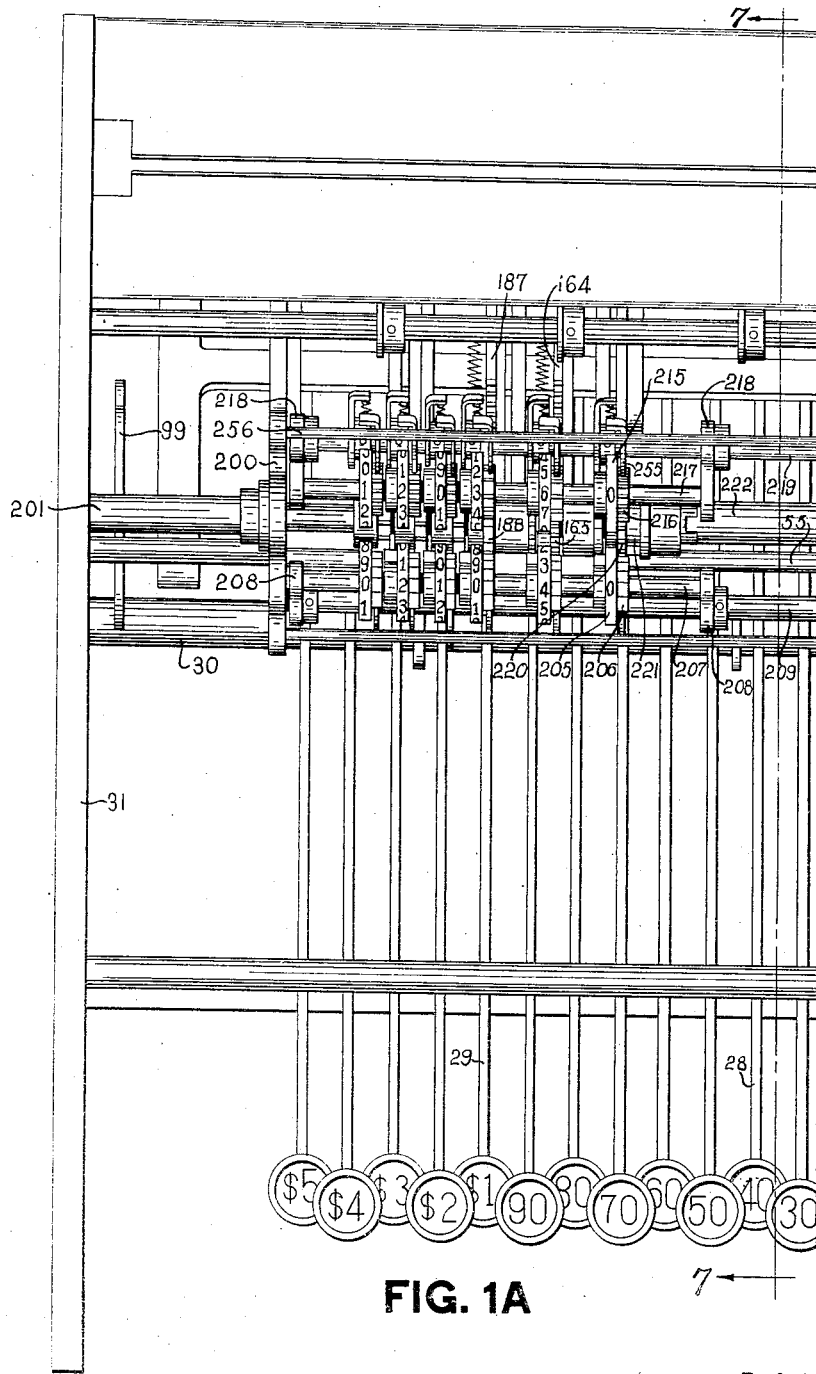

Described in general terms, the machine comprising the invention of this divisional application has two totalizers; actuating mechanism therefor, controlled by groups of depressible keys; totalizer selecting and engaging mechanism controlled by a group of special keys. The indicating mechanism, printing mechanism, bell mechanism and the special counters which count the number of actuations of their respective keys, all of which are illustrated and described in the parent application now Patent No. 1,619,664, have been omitted from this divisional case because they form no part of the invention claimed herein.

The reference numbers used in this case are exactly like the corresponding numbers used for the same parts in the parent case.

Keyboard.

Described in detail, the keyboard comprises four transaction keys 25; one clerk's initial lever 26; one "5" cent key lever 27; nine amount key levers 28, arranged from "10" to "90"; and five key levers 29, arranged from "$1" to "$5".

The transaction key levers 25 are "Cash", "Charge", "Received-on-account" and "Paid-out".

The key levers 25 to 29, are all loosely mounted on a rod 30 (Figs. 5 and 7) carried by parallel side frames 31 and 32 (Figs. 1ᴬ and 1ᴮ).

The rear end of each of the key levers 25, 27, 28 and 29, rests on a bar 33, mounted between the frames 31 and 32.

Secured to the bar 33 and another bar 34 (Figs. 5 and 7) is a guide plate 35 having slots (not shown) therein, which are for the purpose of keeping the rear end of the levers in their proper lateral positions.

The forward ends of the levers are held in their lateral positions by means of slots (not shown) in a guide plate 36 and mounted between a rod 37 and a bar 38, both of which are carried by the side frames 31 and 32.

Figure 10:
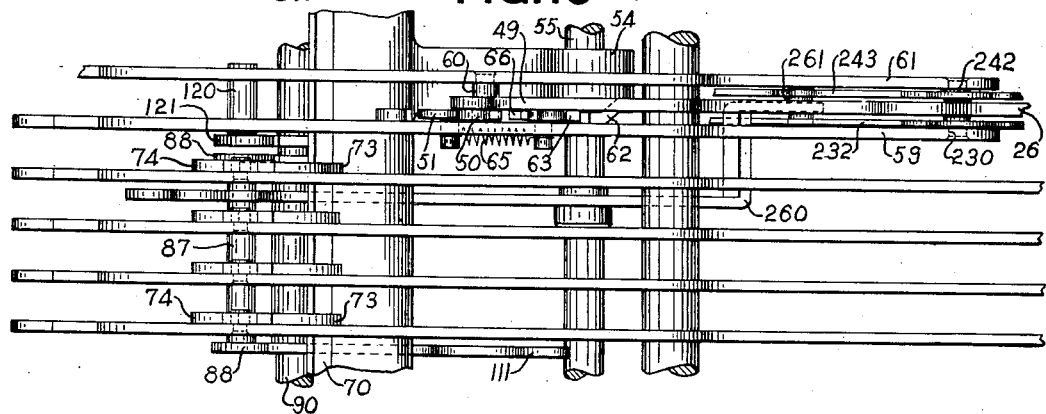
Fig. 10 is a fragmentary bottom view of the clerks' and transaction keys and shows their control of the totalizer engaging means.

The key levers 25, 28 and 29 are arranged in groups. The rear end of the clerk's lever 26 (Figs. 2, 10 and 13), has integral therewith an arm 49 carrying a pin 50, which co-operates with an arm 51 pivoted at 52 to an L-shaped bracket 53 (Fig. 2), carried by a key coupler 54 fast on a shaft 55 mounted in the side frames 31 and 32.

The arm 51 has a nose 56 and a foot 57. The nose 56 co-operates with a stud 58 on a lever 59 loose on the rod 30. The foot 57 co-operates with a stud 60 (Figs. 2, 9 and 10) on a lever 61, loose on the rod 30. These levers 59 and 61 are for the purpose of rocking the proper clerk's totalizer into engagement with the actuators to be hereinafter described. The lever 26 (Fig. 1ᴮ) which extends forwardly, carries the inscription "B," which designates clerk "B." When this lever is operated or rocked clockwise (Fig. 13) around the rod 30, its integral arm 49, through the pin 50, rocks the arm 51 clockwise, thereby moving the nose 56 underneath the stud 58, on the lever 59. With the nose 56 in this position, when the arm 51 is raised, by means to be hereinafter described, "B's" totalizer is rocked into engagement with the actuator.

However, when the arm 51 is caused to remain in the positions shown in Figs. 5, 9 and 13, upward movement of the arm 51 through the pin 60 and the foot 57, rocks the lever 61 clockwise (Fig. 9) and thereby, through means to be hereinafter described, causes "A's" totalizer to be rocked into engagement with the actuators.

When clerk "B" is operating the machine, there is means provided whereby when the "B" key 26 is depressed, it will remain depressed until an amount key has been operated, after which said "B" key is returned to its normal position. This means is a tongue 62 (Figs. 2, 5, 10 and 13) bent out of the side of the arm 49 so that it lies in the plane of a hook 63, integral with the lower end of a lever 64, loose on the shaft 55. The hook 63 is held in the positions shown in Figs. 5 and 13 by a coil spring 65 stretched between the lever 64 and the pin on the arm 51. Incidentally, this spring 65 also serves to maintain the arm 51 in its normal position.

When the lever 26 is depressed, it rocks the arm 49 counter clockwise (Fig. 5) and clockwise (Fig. 13) and positions the nose 56 underneath the pin 58, as previously described. The tongue 62 is raised, whereby the lever 64 is rocked clockwise under the influence of the spring 65, so that the hook 63 engages the underside of the tongue 62 and retains the arms 49 and 51 and the lever 26 in the moved position.

The key coupler 54 is rocked counter clockwise (Figs. 5 and 12) as will be herein described, and as it nears the end of this counter clockwise movement a lug 66 thereon strikes the upper end of the lever 64 and rocks it counter clockwise, which disengages its hook 63 from the tongue 62. A spring 67 then returns the lever 26 to normal position and the spring 65 returns the arm 51 to its normal position.

As before stated, the key coupler 54 co-operates with the key levers 25, 27, 28 and 29, and also with the two levers 59 and 61. As is well known in the art, the purpose of the key coupler is to permit the starting of an operation of two or more keys, for example, the $1 key and the 60¢ key, and then complete the operation by pressing either one of the keys. This is accomplished through a lip 70 engaging notches 71 in the keys 27, 28 and 29. The lip 70 on the key coupler normally lies against the upper edge of the rear portion of the key levers 27, 28 and 29, and also the levers 59 and 61, and is held there by its own weight. Depression of a key 27, 28 or 29 causes said key to rock counter clockwise (Figs. 5 and 7) whereby the lip 70 engages the notch 71 and the key coupler is rocked in a counter clockwise direction (Figs. 5 and 7) and clockwise (Figs. 9 and 13). All of the keys which are not depressed are held in their normal position because the lip 70 on the key coupler in its upward movement passes just in front of a curved surface 69 on all of the keys which are not operated. When a key has been fully depressed and the operator releases it, the weight of the key coupler 54 rocks the operated key clockwise to normal position.

*Transaction keys.*

The transaction key levers 25 are what are commonly called in the art "flexible keys", that is, they are so constructed that they may be partially depressed and locked in this position without affecting the key coupler, after which, by depression of any of the amount keys they are carried down the full extent, whereby they will, through the means fully illustrated and described in the parent case, set up the proper printing wheels and proper indicators. These levers are each provided with a recess 72 (Figs. 5, 9, and 13) and have pivotally mounted on the side thereof two pawls 73 and 74. The pawl 73 is loose and hangs in the position shown by its own weight. The pawl 74 is held in the position shown by a spring 79. The lower end rests against a lug 75, integral with the collar 76, fast on a rod 77, carried by the side frames 31 and 32. Upon depression of the "Paid-out" key lever 25 the rear end of the lever is raised, whereby the pawl 74 is rocked in a counter clockwise direction (Fig. 5) and clockwise (Figs. 9 and 13) by the spring 79, so that the upper end of the pawl strikes the upper end of the pawl 73. This operation of the "Paid-out" key raises the lever high enough so that the edge 78 is on top of the lug 75, thereby retaining the key in its partially depressed position. After this has taken place, upon depression of any of the amount keys, the key coupler 54 raises the lever 25 still further, and removes the pawl 74 from the lug 75, thereby allowing the spring 79 to rock the pawl 74 still further in the direction mentioned. As the key coupler 54 rises, the lip 70 strikes the pawl 73 and rocks it counterclockwise as viewed in Fig. 13, or clockwise as viewed in Fig. 5, thus bringing the edge 81 of said pawl into a position whereby it forms the bottom of a slot in the key 25, like the slot 71 in the amount keys.

As above stated, the pawl 74 is rocked clockwise (Fig. 13) by the spring 79, when the key lever is depressed and the pawl 73 is rocked counter-clockwise (Fig. 13) by the lip 70.

As the key coupler rises, the upper end of the pawl 73 strikes the pawl 74 and rocks said pawl 74 counter-clockwise against the tension of the spring 79. Just before the key is fully depressed, the pawl 74 hooks over the point 80 of the pawl 73. This locks the pawl in a position so that its edge 81 as above stated forms the bottom of a slot exactly like the slot 71 in the other keys. The top of said slot in the key is like the top of the slot 71 in the amount keys and upon the complete depression of any of the amount keys the "Paid-out" key is carried up with said amount key and its rear end caused to be raised the same extent as the amount key. When the operator releases the key, the key coupler 54, through its engagement with the edge 81 of the pawl 73 rocks the lever 25 to normal position. The pawl 73, therefore, serves as a means whereby the lever 25 may be positively returned to its normal position by the key coupler 54. The counter-clockwise rocking of the pawl 74 by the pawl 73, positions the pawl 74 so that the lower edge 78 thereof will not act as a stop for the key 25 when said key is released. Therefore, just before this lever 25 reaches its normal position, an edge 82 of the pawl 74 contacts the lug 75, thereby rocking said pawl in a clockwise direction (Fig. 5) and counter clockwise (Figs. 9 and 13), whereby its hook is released from the point 80 of the pawl 73 and the lever is returned to its normal position.

*Actuating mechanism.*

There are three groups of actuating devices in this machine for controlling the previously mentioned totalizers; one associated with the lever 27; one device associated with the group of levers 28; and another device associated with the group of levers 29. These actuating devices are controlled directly by the operation of the amount key levers 27, 28 and 29. There are also two other actuating devices, one associated with the levers 25 and the other with the lever 26, for setting the type wheels appropriate to said levers 25 and 26.

The actuating mechanism associated with the transaction key levers 25 will be described first. The rear end of each of these levers has a slot 86, co-operating with a rod 87 (Figs. 5, 8, 9, 10 and 13), carried by parallel arms 88, connected by a sleeve 89, loose on a rod 90, carried by the side frames 31 and 32.

Figure 5:
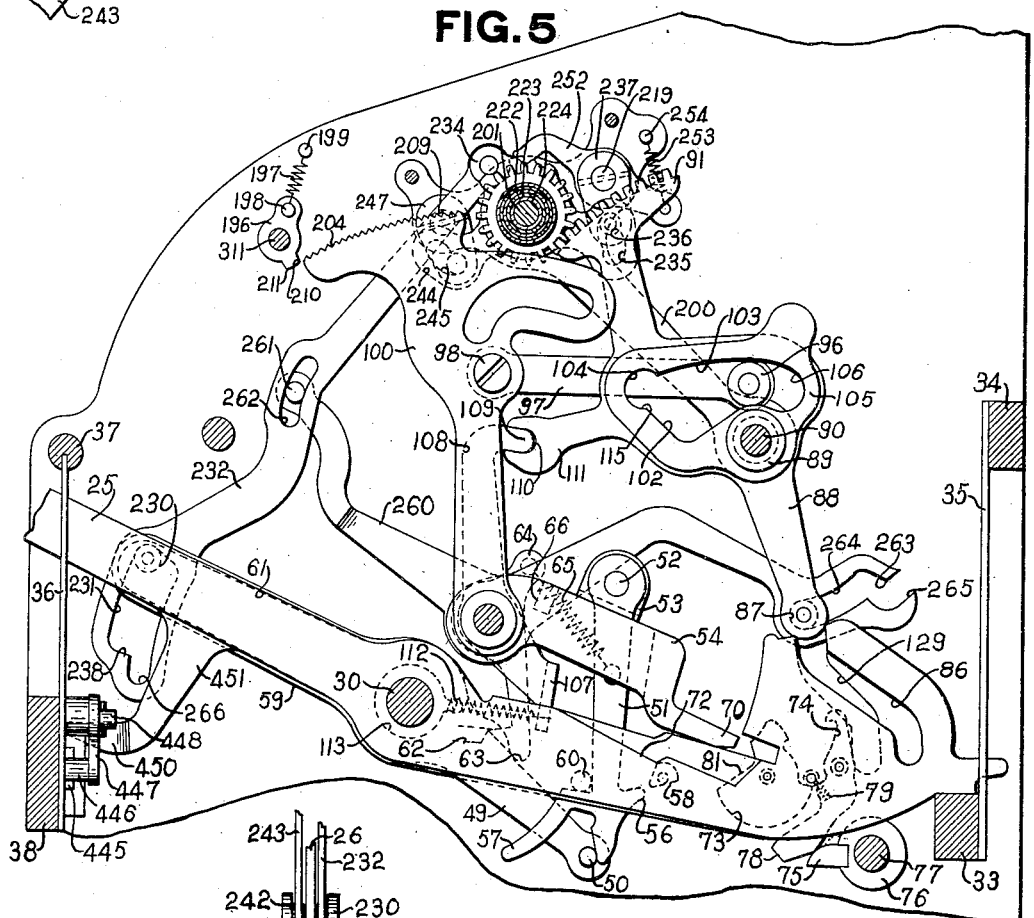
Fig. 5 is a sectional view on line 5—5 of Fig. 1<sup>B</sup> looking in the direction of the arrow.

Only one of these slots 86 is shown in Fig. 5; Figs. 9 and 13 show how these slots are staggered or arranged at different angles, so that when the rear end of the lever is raised, each of the levers 25 will move the rod 87 a different distance toward the back of the machine. Integral with the lefthand arm 88 as viewed in Fig. 8 is a segment 91, meshing with a gear 92, which is for the purpose of imparting movement to the transaction printing mechanism.

This arm 88 (Figs. 4 and 5) is also provided with an opening 95, into which projects a roller 96, carried by one end of a link 97, the other end of which is loose on a rod 98, carried by an arm 99 (Figs. 1^A and 7), and an arm 100 (Figs. 1^B and 5), both of which are fast on the shaft 55, to which is also fast the key coupler 54. There is also an arm 105 with an opening 106 like the opening 95.

Co-operating with all of the levers 25 is a bail 107 (Figs. 5 and 8) integral with an arm 108, loose on the shaft 55. The arm 108 has a finger 109, extending into a notch 110 in an arm 111, integral with the arm 88.

The bail 107 is held in contact with the levers 25 by a coil spring 112, stretched between said bail and a collar 113 on the shaft 30.

The operation of the just-described device is as follows: Depression of any one of the key levers 25 rocks said lever counter clockwise (Fig. 5) thereby raising its rear end and simultaneously raising the bail 107, thus disengaging its finger 109 from the arm 111. Just before this disengagement the slot 86 in the operated lever engages the rod 87. This slot has a neutral portion at the top which is concentric with the center of the rod 30, so that as the lever is moved still further, the rod 87 is not moved out of position until after the finger 109 is entirely disengaged from the arm 111. After this happens the angular portion of the slot 86 moves the rod 87 toward the rear of the machine, thereby rocking the arms 88 and consequently the segment 91 in a counter clockwise direction, thereby rotating the gear 92 clockwise a distance corresponding to the angle of the slot 86 in the operated key.

When the key coupler 54 is rocked counter clockwise (Fig. 5) (which rocking it will be remembered takes place after the depression of one of the amount keys 28 or 29, it being impossible to fully depress one of the keys 25 without depressing one of the amount keys) it rocks the shaft 55, and consequently the arms 99 and 100 in the same direction, thereby moving the link 99 toward the front of the machine. This forward movement of the link 97 takes place approximately at the same time that the arm 88 is being rocked in a counter clockwise direction under the control of the slot 86.

Figure 4:
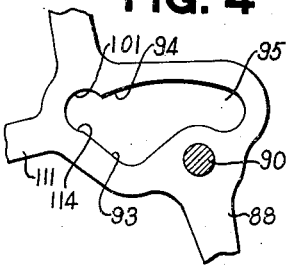
Fig. 4 is a fragmentary detail view of the differential lever controlled by the transaction keys.

Let it be assumed that before the operation just described, the parts were in the position illustrated in Figs. 4 and 5. As the arm 88 is rocked counter clockwise and the link 97 is being moved toward the front of the machine, the roller 96 will tend to follow the edge 93 of the opening 95 in arm 88 until it comes to a neutral neck 114, or the notch 101 (Fig. 4) of said opening. But due to the fact that the position of the opening 95 is changed by depression of an amount key, and therefore no longer coincides with the opening 106 in the arm 105, the roller 96, because it projects into both of the openings 95 and 106, will follow the edge 102 of the opening 106 in the arm 105 and move said arm clockwise until the roller 96 comes to a neutral neck 115, or the notch 104 of said opening. As the arm 88 is being moved counter-clockwise while the link 97 is being moved toward the left (Fig. 5), the edge 94 of the opening 95 may strike the roller 96, thus rocking the arm 105 counter-clockwise. During this time the link 97 is being moved to the left and as it reaches its maximum position, the roller 96 finally enters the notch 101 of the arm 88 and the notch 104 of the arm 105. When the roller is in the notch 101 (Fig. 4) and the notch 104 (Fig. 5) or at the neutral necks 114 and 115, it has positioned the arm 105 commensurate with the angle of the slot 86 (Fig. 9) of the key which has been operated.

Figure 14:
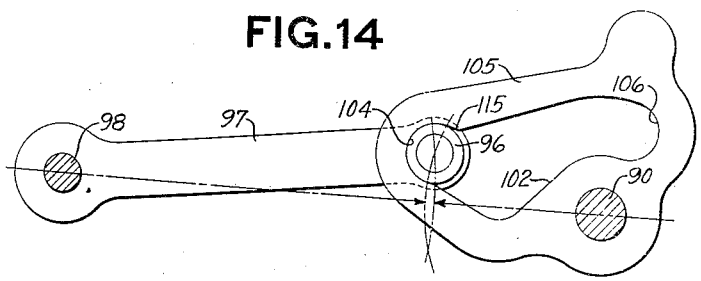
Figs. 14, 15 and 16 are enlarged views showing three positions of a part of the actuating mechanism.
Figure 15:
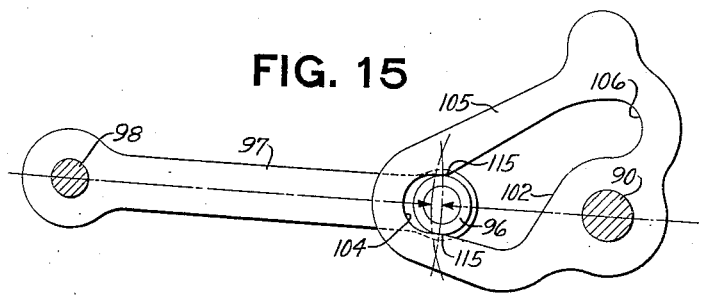
Figure 16:
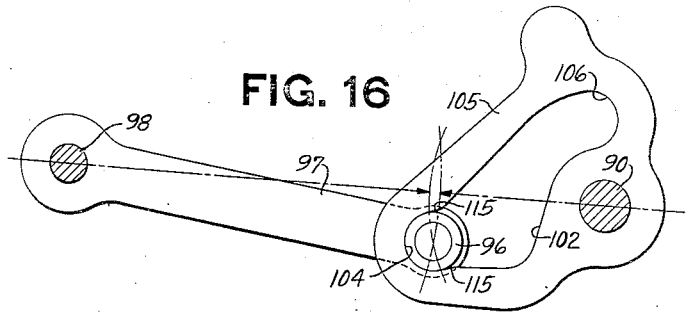

In Figs. 14 to 16 inclusive is shown the construction of the neck 115 of the notch 104 in the arm 105. Since the opening 106, neck 115, and notch 104 of the arm 105 are identical with the opening 95, neck 114, and notch 101 in the arm 88, it is not thought necessary to show the arm 88.

In Fig. 14 the arm 105 is shown in its extreme right-hand position, and the link 97 and roller 96 in their extreme left-hand and also upper positions. (The right and left-hand positions are mentioned with reference to the mechanism disclosed in Fig. 5). In this position, the center of the roller coincides with the center of the radius for the notch 104.

In Fig. 15 the arm 105 is shown in an intermediate position, the link 97 is somewhat lowered and the roller 96, consequently, is moved to the right relative to the center of the notch 104.

In Fig. 16 the arm 105 is shown in its extreme left-hand position and the link 97 in its extreme downward position, and the center of the roller 96 in this position again coincides with the center of the radius of the notch 104.

From these figures it can be clearly seen that the center of the notch 104 describes an arc, with the shaft 90 as the center, during the movement of the arm 105 from its position shown in Fig. 14 to that shown in Fig. 16. The center of the roller 96 also describes an arc, with the rod 98 as the center, in its movement from the position shown in Fig. 14 to that shown in Fig. 16. These two arcs are represented by dot-and-dash lines, and the intersection thereof is shown in Figs. 14 and 16. Fig. 15 shows the center of the roller 96 at its greatest distance from the center of the notch 104, which is on a line struck from the center 98 and passing through the centers of the notch 104, roller 96 and shaft 90. This line is also shown by dots and dashes. The distance between the two arrows, is the length of the perpendicular to the chords of both arcs. To insure the proper setting of the arm 105 at all differential positions between the points of intersection of these arcs, the neutral necks 114 and 115 are provided, and these necks are equal in length to the distance between the two arrows.

This arm 105 is used for the purpose of setting the indicating mechanism, which is fully illustrated and described in the above mentioned Patent 1,619,664. This indicating mechanism is not illustrated or described herein, because it forms no part of the invention claimed.

The clockwise movement of the key coupler 54 (Fig. 5) to normal position, rocks the shaft 55 and the arms 99 and 100 likewise, thereby moving the link 97 toward the rear of the machine. In its rearward movement the roller 96 has no effect upon the arm 105.

Just before the operated key reaches its home position, the finger 109 of the arm 108 engages the slot 110 of the arm 111 and holds said arm, the arm 88, the segment 91 and the rod 87 in their normal position.

If an operation of the machine involving the "Paid-out" key is made, the arm 105 (Fig. 5) is rocked counter clockwise to its farthest position, and is caused to remain in this position until a subsequent operation of the machine.

Should the subsequent operation of the machine involve the operation of a "Cash" key, when the link 97 is moved toward the front of the machine, its roller 96 follows the edge 93 of the opening 95 in the arm 88 until it reaches the neutral neck 114 of said opening. During this operation the roller 96 engages the edge 103 of the opening 106 in the plate 105, and rocks the plate in a clockwise direction until the roller is engaged in the neutral neck 115 of said opening 106. This positions the plate arm 125 from the "Paid-out" position, in which it was left in the previous operation to the "Cash" position in the subsequent operation.

The differential mechanism associated with the clerks' keys 26 and the clerks' levers 59 and 61 is substantially the same as that described in connection with the transaction keys, and therefore, only a brief description of it will be given.

The levers 59 and 61 are provided with slots similar to the slots 86 in the keys 25, and co-operate with the stud 120 (Figs. 8 and 10) carried by an arm 121, loose on the rod 90.

Integral with the arm 121 is a segment 122, meshing with a gear 123, which is for the purpose of setting the clerk's initial type wheel so that the character corresponding to the lever operated may be printed. Integral with the arm 121 is another arm (not shown), like the arm 111, as shown in Fig. 5. This arm also has a slot like the slot 110 and has co-operating therewith an aligning arm 124, having integral therewith a bail 125 (Figs. 8 and 9) extending across the top of the two levers 59 and 61 and held in this position by a spring like the spring 112. Also loose on the rod 90 and adjacent to the arm 121 is an arm 126, identically like the arm 105 associated with the transaction keys.

Loose on the rod 98 is a link 127 (Fig. 1ᴮ) carrying the roller, which extends through openings (not shown) in the arms 121 and 126 (Fig. 8). This arm 126 and link 127 cooperate with indicating mechanism not shown in this divisional case.

The operation of this differential mechanism is exactly the same as that used in connection with the transaction keys, except instead of having four key levers controlling the movement of the arm 121, there are only two levers 59 and 61.

The "5" cent key lever 27 has associated therewith a differential mechanism which is identically the same as that just described in connection with the clerks' levers 59 and 61.

The lever 27 is provided with a slot 129 (Fig. 5), which co-operates with a stud 130 (Fig. 8) on an arm 131, like the arm 88, loose on the rod 90. The arm 131 also has integral therewith a segment 132, meshing with a gear 133, which is for the purpose of setting up the "5" cent or "units" type wheel.

This arm 131 also has co-operating therewith an aligning arm 134 (Fig. 8), loose on the shaft 55. Integral with the arm 134 is a bail 135, which extends over the top of the "5" cent lever 27 and is held in such position by a spring. Also loose on the rod 90 and adjacent to the arm 131 is an indicator selecting arm 136 like the arm 105. The arms 131 and 136 are provided with openings like the openings 95 and 106, respectively, in the arms 88 and 105.

The operation of the differential mechanism associated with the "5" cent key lever 27 is practically the same as that associated with the transaction key lever 25, therefore, this operation will not be repeated here.

The differential mechanism associated with the levers 28 will now be described:—

The levers 28 are each provided with a slot 145 (Fig. 7) set at different angles and co-operate with a rod 146 (Fig. 8), carried by parallel arms 147, secured to a sleeve 148, loose on the rod 90. Integral with the arm 147 is an arm 149 (Fig. 7) having a slot 150 into which projects a finger 151 of an aligning arm 152, loose on the shaft 55. Integral with the arm 152 is a bail 153 (Fig. 8), which has integral therewith another arm 154, loose on the shaft 55. The bail 153 extends across the tops of all of the levers 28 and is held in contact therewith by a coil spring 155, secured to the bail and to a collar 156 on the rod 30.

Fast on the sleeve 148 is an arm 157 (Figs. 7 and 8) having pivotally mounted thereon at point 158 a bell crank 159, which co-operates with the transfer mechanism of the totalizer.

The operation of the just-described mechanism is as follows:—

Upon the depression of, for instance, the "60" cent key lever 28, said lever is rocked counter clockwise (Fig. 7) thereby raising the bail 153 and rocking the arm 152 counter clockwise and disengaging its finger 151 from the arm 149. Just before this disengagement the slot 145 engages the rod 146 and rocks the arm 147, sleeve 148 and the arm 157 in a counter clockwise direction a distance depending upon the angle of the slot 145. This movement of the arm 157 causes the arm 162, and segment 164 to be rocked counter clockwise through the bell crank 159, roller 160 and slot 161, thereby rotating the gear 165 in a clockwise direction a distance commensurate with the value of the key depressed.

The counter clockwise movement of the lever 28 also rocks the key coupler 54 and the shaft 55 counter clockwise, thereby rocking the arms 99 and 100 counter clockwise, and causing the rod 98 to be moved toward the front of the machine, thereby moving the link 172 therewith. This link has a roller extending into a slot in the arm 169 fast on sleeve 148 and also extending into a slot in an arm 173 (Fig. 8) for the purpose of setting the indicators.

When the lever 28 has been fully depressed, the operator releases the lever, and through the weight of the key coupler 54 the lever is rocked in a clockwise direction to its normal position. This movement through the slot 145, rocks the arm 147, sleeve 148 and arms 157 and 169, in a counter clockwise direction to their normal position. Through the bell crank 159, the arm 162 and segment 164 are rocked clockwise to their normal position. It might be stated here that in Fig. 7 the segment 164 and bell crank 159 are shown in a position in which a transfer has taken place, consequently the segment 164 is moved one step further toward the right than it would be normally. In the normal position the roller 160 is in the upper part of the slot 161.

Just before the arm 147 reaches its normal position, the finger 151 engages the arm 149, thereby aligning the arm 149, the arms 147, rod 146, and the arm 157 in their normal position.

The differential mechanism associated with the dollar key levers is substantially the same as that described in connection with the lever 28, therefore, but a brief description will be given here.

Each of the levers 29 has a slot 179, (Fig. 7), which co-operates with a rod 180 (Fig. 8), carried by parallel arms 181, fast on a sleeve 182, journaled on the rod 90.

Integral with the lefthand arm 181 (Fig. 8) is an arm 183, like the arm 157. This arm 183 carries a bell crank 184, carrying an antifriction roller 185 projecting into a slot (not shown) in an arm 186, loosely mounted on the sleeve 182. The bell crank 184 and roller 185 are identically the same as the bell crank 159 and the roller 160 associated with the lever 28.

Integral with the arm 186 is a segment 187 meshing with a gear 188. Arm 186 and segment 187 are identically the same as the arm 162 and segment 164, previously described. The gear 188 is for the purpose of actuating the "units of dollars" totalizer wheel and also for setting up the type wheel associated with that denominational order. Integral with the righthand arm 181 (Fig. 8) is an arm identically the same as the arm 149 and it carries a slot like the slot 150, which cooperates with an aligning arm 189, loose on the shaft 55. Integral with the arm 189 is a bail 190 extending across all of the levers 29. Also integral with the bail 190 is another arm 191, loose on the shaft 55, and is for the purpose of giving a bearing to this end of the bail so that it may be oscillated freely. The bail 190 is held in contact with the lever 29 by a spring (not shown) but like the spring 155.

The operation of the above described devices is identically the same as that given in connection with the actuating mechanism associated with the key lever 28, therefore, it is not thought necessary to repeat the same description.

*Full stroke device.*

The machine is provided with a full-stroke device so that when an amount key is started its operation must be completed.

This mechanism includes a pawl 196 (Fig. 5) loose on a rod 311; a spring 197 stretched between a pin 198 carried by the pawl, and a stud 199 mounted on the side frame 31; and a series of notches 204 formed in the upper edge of the arm 100.

Counter clockwise movement of the arm 100 causes said arm to strike point 210 on the pawl 196 and rock said pawl clockwise. This point then co-operates with the notches 204 whereby the pawl 196 is maintained in such a position that a clockwise movement of the arm 100 is prevented.

At the completion of the counter clockwise movement of the arm 100, the pawl 196 is disengaged from the notches 204 and when the arm 100 is rocked clockwise to normal position it engages a point 211 on the pawl 196 and rocks said pawl counter clockwise, whereby the point 211 co-operates with the notches 204 in such a way that counter clockwise movement of the arm 100 is impossible.

From the above it can be seen that when the operator depresses a key he must complete the depression thereof, and when he releases the key after the complete depression, said key must return to its normal position before it or any other key can be operated.

*Totalizers.*

As before stated, the machine is provided with two totalizers, one for each of the two clerks, and for convenience and description, one of the totalizers will be called "A's" totalizer and other "B's" totalizer.

Figure 3:
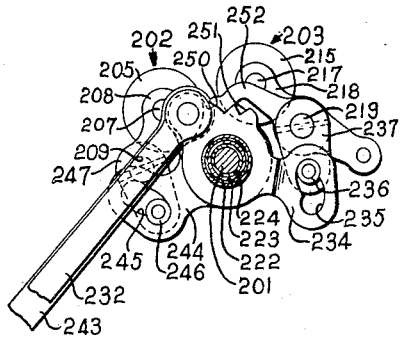
Fig. 3 is a detail view, showing the means for rocking the totalizers into mesh with the actuating gears, the operating links being broken away.

The totalizers are supported by a frame work comprised of two parallel arms 200 (Figs. 1A, 5 and 7) having one end mounted on the rod 90 and the other end supported by a shaft 201 in the side frames 31 and 32. "A's" totalizer will be given a general number 202 and the "B's" totalizer 203. (Figs. 3 and 7).

"A's" totalizer 202 has six wheels 205 (Figs. 1A, and 11) the units and tens, and units of dollars wheels each having secured to the side thereof a pinion 206. These wheels are loose on a rod 207, carried by parallel arms 208, fast on a shaft 209, supported in the arms 200.

"B's" totalizer has six totalizer wheels 215, the units and tens, and units of dollars wheels each having secured to the side thereof a pinion 216 (Figs. 1A, and 5). These wheels are loose on a rod 217 carried by parallel arms 218 fast on a shaft 219, carried by the arms 200.

The pinions 206 and 216 are normally out of engagement with the actuating gears. The pinions 206 and 216 which are secured to the units wheels 205 and 215, are arranged to be engaged by means to be hereinafter described, with a gear 220, (Figs. 1ᴬ and 7) secured to sleeve 221, connected by a mortise and tenon connection to a sleeve 222, the other end of which is secured to the previously described gear 133, (Figs. 1ᴮ and 8) which is positioned by the movement of the "5" cent key lever 27. The sleeves 221 and 222 are loose on a sleeve 223, which in turn is mounted on a sleeve 224, loose on the shaft 201. The purpose of the sleeves 223 and 224 will be hereinafter described.

The pinions 206 and 216 which are secured to the "10's" totalizer wheels 205 and 215, respectively, are arranged to engage with the previously described gear 165 (Fig. 1ᴬ). This gear 165 is secured at one end to the sleeve 223, and from the previous description it will be remembered that this gear is positioned by the segment 164 (Fig. 7) controlled by the "10" to "90" key levers 28.

The pinions 206 and 216, which are fast to the units of dollars totalizer wheels 205 and 215, respectively, are arranged to be engaged with the gear 188. This gear is fast on one end of the sleeve 224 and is positioned by the segment 187 (Fig. 1ᴬ) under the control of the "$1" to "$5" key levers 29.

Totalizer engaging mechanism.

As previously stated, the machine is arranged to be operated by two different clerks, clerks "A" and "B". There are two clerks' levers 59 and 61 (Figs. 8, 9, 10 and 13) the lever 59 being operated when clerk "B" operates the machine and the lever 61 being operated when clerk "A" operates the machine. As there is only one clerk's initial lever 26 extending out of the front of the machine, clerk "A's" lever 61 is automatically operated, as will be remembered, by the pin 60 and arm 51, when the key coupler 54 is raised by depression of one of the amount keys. When this lever 61 is operated clerk "A's" totalizer 202 is rocked into engagement with its actuating gears. When clerk "B" operates the machine, he first depresses the lever 26, thereby breaking the connection between the arm 51 and the pin 60 on "A's" lever 61, and effectively connects the arm 51 with the stud 58 on "B's" lever 59, so that when the arm 51 is raised by the key coupler 54, "B's" totalizer 203 is rocked into engagement with its actuating gears.

In the accomplishment of these results, "B's" lever 59 has a pin 230 (Figs. 1ᴮ, 5 and 13) which projects into an opening 231 in a link 232, the upper end of which is pivoted to a lever 234, loose on the sleeve 222. The lever 234 has a cam slot 235, into which projects a roller 236, on an arm 237, fast on the shaft 219.

It will be remembered that the arms 218 which carry the rod 217 supporting the totalizer wheels 215 are also fast on the shaft 219. It will thus be seen that, as the lever 59 is rocked counter clockwise (Fig. 5) or clockwise (Fig. 13) by the arm 51 and stud 58, and as said lever 59 nears the completion of this counter clockwise movement (Fig. 5) or clockwise movement (Fig. 13) the pin 230 strikes a shoulder 238 in the opening 231. When this occurs, and by the continued movement of the lever 59 to its full extent, the link 232 is moved forwardly in the direction of its length, thereby rocking the lever 234 counter clockwise (Fig. 3) or clockwise (Fig. 13) and through the slot 235 and roller 236, rocks the arm 237, shaft 219 and arm 218 counter clockwise (Fig. 3) or clockwise (Fig. 11), thereby engaging the pinions 216 with gears 165, 188 and 220. This engagement occurs just before the outer ends of the amount levers 28 and 29 reach the end of their complete depression or counter clockwise movement (Fig. 7). The slots 145 in these levers have at their lower end a neutral portion whereby the rods 146 and 180 are held stationary. This neutral portion is for the purpose of maintaining the gears 165, 188 and 220 in the position to which they have been differentially set until after the totalizer pinions 215 have been engaged therewith, as just described.

With the totalizer pinions in engagement with the above mentioned gears, it can be readily seen that when the operator releases the amount levers 28 and 29, and they are rocked clockwise (Fig. 7) to their normal position by the key coupler 54, the amount corresponding to the value of the key which has been depressed, is accumulated upon the units and tens of cents and units of dollars totalizer wheels 215. This is caused, as will be remembered, by the segments 132, 164 and 187, in the manner previously described.

When clerk "A" is registering a sale on the machine, "A's" lever 61 (Figs. 5 and 9) is automatically rocked counter clockwise (Fig. 5) or clockwise (Fig. 9) and then clockwise (Fig. 5) or counter clockwise (Fig. 9), to normal position, as previously described.

"A's" lever 61 carries a pin 242 (Figs. 1ᴮ, 9 and 10) which projects within an opening 241, like the opening 231, formed in a link 243 (Figs. 1ᴮ, 3, 9 and 10) the upper end of which is pivoted to a lever 244, loose on the sleeve 222.

The lever 244 has a cam slot 245 into which projects a roller 246, on an arm 247, fast on the shaft 209.

As previously described, the arm 208 which carries the rod 207, supporting the totalizer wheels 205 is also fast on the shaft 209. It will thus be clear that when "A's" lever 61 is rocked counter clockwise (Fig. 5) or clockwise (Fig. 9) and when the pin 242 strikes the shoulder 248 in the link 243 (such shoulder being identical with the shoulder 238 previously described), the link 243 is moved forwardly in the direction of its length, thereby rocking the lever 244 counter clockwise (Fig. 3) or clockwise (Fig. 9) and through the slot 245 and roller 246, rocks the arm 247, shaft 209 and arm 208 clockwise (Fig. 3) or counter clockwise (Fig. 11), thereby engaging the pinions 206 with the gears 165, 188 and 220.

This engagement takes place at identically the same time during the operation of the machine as does "B's" totalizer pinion 216, above described, and when the operator releases the amount keys and they are returned to their normal position, the amount is accumulated in "A's" totalizer in identically the same manner and by identically the same means as that described in connection with "B's" totalizer; therefore, it is not thought necessary to described this accumulating mechanism again.

*Totalizer aligning mechanism.*

Figure 9:
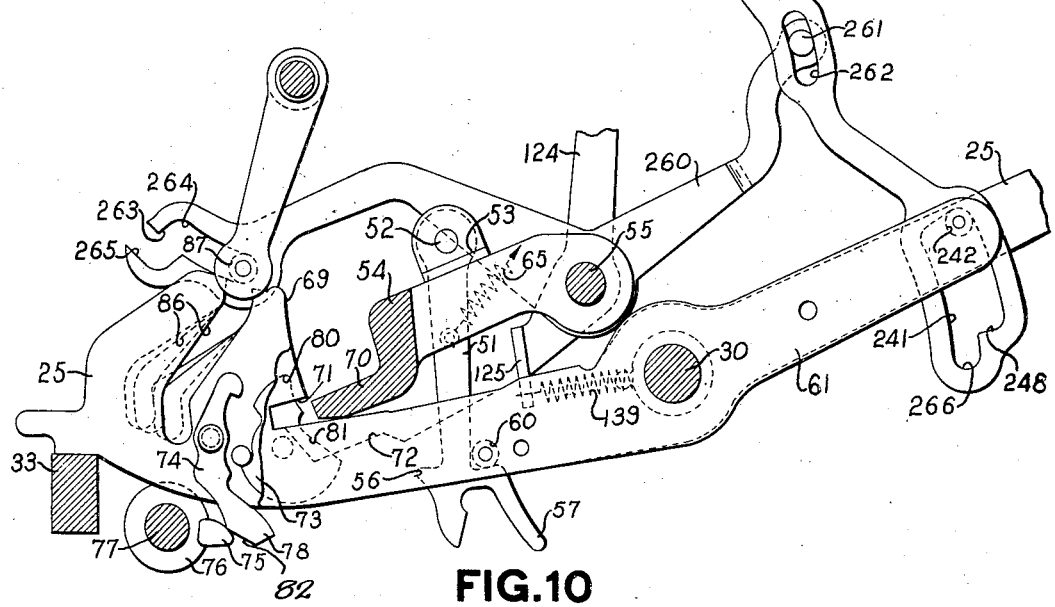
Fig. 9 shows the mechanism for rocking "A's" totalizer into mesh with the actuator, and also shows the transaction keys and their control of said totalizer engaging means.

The levers 234 and 244 each have two notches 250 and 251 (Figs. 3, 5 and 9). Normally engaging the notch 250 in each of the levers is a pawl 252. The pawls are held in engagement with the notches 250 by springs 253 (Fig. 5) stretched between a pin on each of the pawls and a pin 254, carried by the arm 200.

When either of the levers 234 or 244 is rocked counter clockwise (Fig. 3) or clockwise (Figs. 9 and 13), upon the movement of the links 232 and 243, respectively, the pawl is cammed out of the notch 250 and caused to engage the notch 251, thus holding the levers in alignment and consequently holding the totalizer pinions 206 in mesh with their actuating gears.

When in the positions shown in Figs. 3, 9 and 13, with the pawl in the notch 250, said pawl serves to retain the totalizer pinions 206 and 216 out of engagement with the actuating gears. When the totalizers are out of engagement with the actuating gears the pinions 206 and 216 are held in alignment by spring-pressed pawls 255 (Fig. 7) which engage said pinions. When the totalizers are rocked into engagement with their actuating gears the pawls 255 contact with rods 256, carried by the arms 200, thus allowing the pinions 206 and 216 to be rotated. By referring to Fig. 7 it will be noticed that there is a clearance between the rods 256 and the pawls 255, which is to allow the pinions to become engaged with the actuating gears before the aligning pawls are entirely out of engagement with the pinions, thus insuring that no movement of the totalizer wheels takes place at the time they are being engaged. Before the totalizer wheels are finally disengaged from the actuating gears, the aligning pawls 255 are in such position that no possible rotation of the totalizer wheels 205 and 215 can take place, thereby insuring a perfect alignment of the said totalizer wheels at all times.

*Disabling device for totalizer engaging mechanism.*

For certain operations of the machine, such as "Charge" and "Paid out," which no not involve money being received, it is necessary to hold "A's" totalizer 202 and also "B's" totalizer 203 out of engagement with the actuating gears during the entire operation of the machine.

To accomplish the above, a lever 260 (Figs. 1ᴮ, 5, 9 and 13) is loosely mounted upon the shaft 55. The forward end of this lever carries a pin 261, which projects into a slot 262 in each of the links 232 and 243. The rear end of the lever 260 has a slot 263, surrounding the rod 87, controlled by the transaction key levers 25.

As before stated, the slots 86 in these levers are cut at different angles (Figs. 9 and 13), the "Cash" being first, "Charge" second, "Received-on-account" third, and "Paid-out" fourth. The slot in the "Cash" lever has the lesser angle, so that when this lever is depressed, the rod 87 is moved one step to the right (Fig. 5) or left (Figs. 9 and 13). The slot 86 in the "Received-on-account" lever is cut at a slightly greater angle, thereby moving the rod 87 one step farther than the "Cash" key. By depression of either of these two keys, "Cash" or "Received-on-account", the rod 87 is always maintained in the upper portion 264 of the slot 263, consequently an operation of either of these two keys will have no effect upon the lever 260.

However, the slot in the "Charge" key is cut at a greater angle than either the "Cash" or "Received-on-account" keys, consequently, when this key is operated the rod 87 is forced into the mouth 265 of the slot 263, thereby rocking the lever 260 counter clockwise (Fig. 5) or clockwise (Figs. 9 and 13). This movement of the lever 260 through the pin 261 and slot 262 in the links 232 and 243, rocks said links clockwise, (Fig. 5) or counter-clockwise (Figs. 9 and 13).

The angle of the slot 86 in the "Paid-out" key is still greater than the angle of the slot 86 in the "Charge" key and when this key is operated and the rod 87 is moved into the mouth 265 and one step farther than it is moved by the "Charge" key. This also rocks the lever 260 clockwise (Figs. 9 and 13), which rocks the links 232 and 243 counter clockwise with their upper ends as the pivot. The upper portion of the slot 262 in each of the links 232 and 243, is shaped so that when either of the links is moved downwardly to engage its respective totalizer with the actuator, as previously described, such slot has no effect on the pin 261 or lever 260. When either the "Charge" or "Paid-out" key is depressed, the pins 230 and 242 (Figs. 1B, 5, 9 and 13) are in such a position that when either of the levers 59 or 61 is rocked, said pins will not strike the shoulder 238 or 248, but will move into a notch 266 of the openings 231 and 241. This notch 266 is deep enough to allow the full counter clockwise (Fig. 5) or clockwise (Figs. 9 and 13) movement of either of the levers 59 and 61, consequently the links 232 and 243 are not moved downwardly, thereby preventing any movement of the levers 234 or 244, so that neither of the totalizers are rocked into engagement with the actuating gears. The reason for having the slots in all four of the transaction key levers cut at different angles is to permit these keys to be able to differentially position the type carriers co-operating with such keys, and also to be able to differentially position the indicator setting mechanism, as is fully illustrated and described in the parent application, now Patent No. 1,619,664 previously mentioned.

Transfer mechanism.

As the transfer mechanism forms no part of the particular invention claimed in this divisional application, it is not thought necessary to describe such mechanism here. It is believed that it will be sufficient to merely state that there is a transfer mechanism provided for each of the totalizers, whereby when the wheels of lower order pass from "9" to "0", the wheel of next higher order is advanced one step. This particular transfer mechanism for the totalizers shown and described herein, is fully illustrated and described in the parent case Patent No. 1,619,664.

Printing mechanism.

The only parts of the printing mechanism which are shown in this application are the type wheels and the means for setting such wheels.

There are three amount type wheels 380 (Fig. 1B) which are adapted to print the amounts under the control of the amount keys 27, 28 and 29. There is one clerks' type wheel 381, which is adapted to print "A" or "B", depending upon which of the clerks is operating the machine. There is also one transaction type wheel 382, which is adapted to be set differentially under the control of the transaction keys 25, to print a character designating the particular kind of transaction being registered in the machine.

Clerks' locks.

The machine is provided with two locks, which cooperate with the clerks' levers 59 and 61, the purpose of the locks being that when clerk "A" leaves the store he operates his lock, thereby rocking "B's" key lever 26 and holding it in the depressed position so that only "B's" totalizer is rocked into engagement with the actuators. Furthermore, this makes it necessary for clerk "B" to depress his initial key each time he operates the machine when he is in the store alone. Should clerk "B" leave the store, he operates his lock and thereby prevents clerk "A" from depressing "B's" key lever 26, so that when "A" operates the machine only "A's" totalizer is moved into engagement with the actuators.

"A's" lock 443 and "B's" lock 444 (Fig. 6) are mounted in the front cross bar 38. Co-operating with the bolt 445 on the "A" lock is a pin 446 carried by a bell crank 447 mounted on a stud 448 carried by the cross bar 38.

An arm 449 of the bell crank 447 (when both locks are unlocked) rests upon the top of a foot 450 (Figs. 5, 6 and 13) of an arm 451 integral with the lever 26.

When clerk "A" operates his lock 443 and moves the bolt 445 to the right, it, through the pin 446, rocks the bell crank 447 counter clockwise, thereby causing the arm 449 to move the foot 450 of the arm 451 downwardly. This arm 451 being integral with the lever 26 and also the arm 49, causes said lever and said arm to be rocked counter clockwise (Fig. 5) and clockwise (Fig. 13), thereby through the pin 50 moving the arm 51 counter clockwise (Fig. 5) and clockwise (Fig. 13), and causing the nose 56 on said arm to be moved underneath the pin 58 carried by "B's" lever 59. This causes the foot 57 to be moved out of operative relation with the pin 60, which is on "A's" lever 61, as previously described.

From this it can be seen that when "A" operates his lock, he renders his own lever 61 ineffective and causes "B's" key to be depressed, so that only "B's" totalizer is rocked into engagement with the actuating mechanism.

Figure 6:
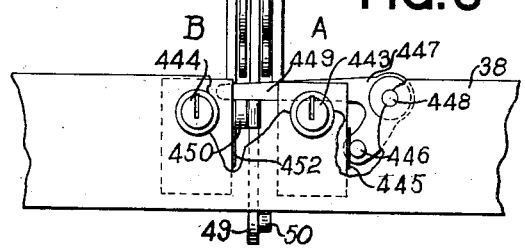
Fig. 6 is a detailed view, partly broken away, illustrating the clerk's lock and counter control over the clerk's key lever.

When clerk "A" returns and unlocks his lock, thereby moving the bolt 445 inwardly to the position shown in Fig. 6, the spring 65 (Fig. 5) rocks the arm 51 clockwise or counter clockwise (Fig. 13) and disengages the nose 56 from the pin 58 and causes the foot 57 to be moved into engagement with the pin 60 which controls the rocking into engagement of "A's" totalizer.

Should clerk "B" wish to lock his totalizer, he operates his lock 444 and moves the bolt 452 (Fig. 6) thereof to the right. This bolt is in such position that when moved to the right, it is directly below the foot 450 of the arm 451. Therefore, it is impossible to rock said arm 451 or the arm 49, or the lever 26, all three of which are integral. Hence when the machine is operated, only clerk "A's" totalizer is rocked into engagement with the actuating mechanism.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

What is claimed is:

1. In a machine of the class described, the combination of item entering means, a plurality of totalizers, a common actuator therefor and normally disengaged therefrom, means for engaging one totalizer with the actuator and for disengaging it therefrom, means for engaging another totalizer with the actuator and for disengaging it therefrom, a rockable member common to and operated by any one of said item entering means, a device directly connected to and operated by said member for operating the first mentioned totalizer engageing means, and manually operated means for causing said device to operate the second mentioned totalizer engaging means in place of the first mentioned totalizer engaging means.

2. In a machine of the class described, the combination of item entering means, a plurality of totalizers, a common actuator therefor and normally disengaged therefrom, means for engaging one totalizer with the actuator and for disengaging it therefrom, means for engaging another totalizer with the actuator and for disengaging it therefrom, a rockable member common to and operated by any one of said item entering means, a device carried by said member and normally connected to the first mentioned totalizer engaging and disengaging means for operating the same, manually operated means for disconnecting said device from the first mentioned totalizer engaging and disengaging means and connecting said device to another totalizer engaging and disengaging means for operating the same; and means for maintaining the manually operated means in its operated position for a plurality of operations when desired.

3. In a machine of the class described, the combination of item entering means, a plurality of totalizers, a common actuator therefor and normally disengaged therefrom, means for engaging one totalizer with the actuator, and for disengaging it therefrom, means for engaging another totalizer with the actuator and for disengaging it therefrom, a rockable member common to said item entering means and operated thereby, a device carried by said member and common to both of said engaging and disengaging means, and manually operated means for controlling said device so that it may be effectively connected with either of the totalizer engaging and disengaging means to operate the same.

4. In a machine of the class described, the combination of item entering means, a plurality of totalizers, a common actuator therefor and normally disengaged therefrom, means for engaging one totalizer with the actuator and for disengaging it therefrom, means for engaging another totalizer with the actuator and for disengaging it therefrom, a rockable member common to and operated by any one of said item entering means, a device carried by said member and normally connected to the first mentioned totalizer engaging and disengaging means for operting the same, manually operated means for disconnecting said device from the first mentioned totalizer engaging and disengaging means and connecting said device to another totalizer engaging and disengaging means for operating the same, means for maintaining said device in effective position after it has been moved until after the respective totalizer has been operated, and means for releasing said device so that it assumes normal position at the end of the operation of the machine.

5. In a machine of the class described, the combination of manipulative amount determining devices, totalizer actuating means controlled thereby, a member common to all of said devices and operated by any of them, a totalizer normally disengaged from said actuating means, a member having a cam slot for engaging said totalizer with said actuating means and for disengaging it therefrom, a pivoted member operated by said common member, a normally effective connection between said cam slotted member and said pivoted member for operating said cam slotted member to cause the totalizer to be engaged with said actuating means upon operation of said common member, a special manipulative device, and means controlled thereby for rendering said connection ineffective to prevent the totalizer from engaging said actuating means upon operation of said common member.

6. In a machine of the class described, the combination of manipulative amount determining devices, totalizer actuating means controlled thereby, a member common to all of said devices and operated by any one of them, a totalizer normally disengaged from said actuating means, a camming member for engaging said totalizer with said actuating means and for disengaging it therefrom, a device connected to said common member and operated thereby, a normally effective connection between said cam member and said device for operating the camming member to cause the engagement of the totalizer with said actuating means upon operation of said common member, a special manipulative device, and means operated thereby for effectively disengaging said connection from said device to prevent the engagement of the totalizer with the actuating means upon operation of said common member.

7. In a machine of the class described, the combination of manipulative amount determining devices, totalizer actuating means controlled thereby, a member common to all of said devices and operated by any of them, a totalizer normally disengaged from said actuating means, a camming member for engaging said totalizer with said actuating means and for disengaging it therefrom, a pivoted member operated by said common member, means normally engaging said pivoted member and adapted to be operated thereby, a normally effective connection between said means and said camming member for causing the engagement of the totalizer and actuating means, a special manipulative device, and means operated thereby for moving said connection to prevent the engagement of the totalizer with the actuating means.

8. In a machine of the class described, the combination of manipulative amount determining devices, totalizer actuating means controlled thereby, a member common to all of said devices and operated by any of them, a totalizer normally disengaged from said actuating means, a camming member for engaging said totalizer with said actuating means and for disengaging it therefrom, a pivoted member operated by said common member, means normally engaging said pivoted member and adapted to be operated thereby, a normally effective connection between said means and said camming member for causing the engagement of the totalizer with the actuating means upon the operation of said common member, special manipulative devices, and means controlled by either of said special devices for moving said connection to prevent the engagement of the totalizer with the actuating means.

9. In a machine of the class described, the combination of manipulative amount determining devices, totalizer actuating means controlled thereby, a member common to all of said devices and operated by any of them, a totalizer normally disengaged from said actuating means, a camming member for engaging said totalizer with said actuating means and for disengaging it therefrom, a pivoted member operated by said common member, means normally engaging said pivoted member and adapted to be operated thereby, a normally effective connection between said means and said camming member for causing the engagement of the totalizer with the actuating means upon the operation of said common member, a plurality of special manipulative devices, and means controlled thereby for controlling said connection to determine whether said totalizer will be engaged with said actuating means upon operation of said common member.

10. In a machine of the class described, the combination of manipulative amount determining devices, totalizer actuating means controlled thereby, a member common to all of said devices and operated by any of them, a totalizer normally disengaged from said actuating means, a camming member for engaging said totalizer with said actuating means and for disengaging it therefrom, a pivoted member operated by said common member, means normally engaging said pivoted member and adapted to be operated thereby, a normally effective connection between said means and said camming member for causing the engagement of the totalizer with the actuating means upon the operation of said common member, a plurality of special manipulative devices, a second pivoted member engaging said connection and controlled by said special manipulative devices for determining the effectivity of said connection.

11. In a machine of the class described, the combination of item entering means, a plurality of totalizers, a common actuator therefor normally disengaged therefrom, means for engaging one totalizer with the actuator and for disengaging it therefrom, means for engaging another totalizer with the actuator and for disengaging it therefrom, a rockable member common to said item entering means and operated thereby, a device carried by said member and common to all of said engaging and disengaging means, manually operated means for controlling said device so that it may be effectively connected with any one of the totalizer engaging and disengaging means to operate the same, means common to all of said engaging and disengaging means for determining the effectivity of all of said engaging and disengaging means when controlled by said manually operated means.

12. In a machine of the class described, the combination of item entering means, a plurality of totalizers, a common actuator therefor normally disengaged therefrom, means for engaging one totalizer with the actuator and for disengaging it therefrom, means for engaging another totalizer with the actuator and for disengaging it therefrom, a rockable member common to said item entering means and operated thereby, a device carried by said member and common to all of said engaging and disengaging means, manually operated means for controlling said device so that it may be effectively connected with any one of the totalizer engaging and disengaging means to operate the same, and a pivoted member common to all of said engaging and disengaging means and connected thereto for determining the effectivity of said engaging and disengaging means upon operation of said common member.

13. In a machine of the class described, the combination of item entering means, a plurality of totalizers, a common actuator therefor normally disengaged therefrom, means for engaging one totalizer with the actuator and for disengaging it therefrom, means for engaging another totalizer with the actuator and for disengaging it therefrom, a rockable member common to said item entering means and operated thereby, a device carried by said member and common to all of said engaging and disengaging means, manually operated means for controlling said device so that it may be effectively connected with any one of the totalizer engaging and disengaging means to operate the same, a pivoted member common to all of said engaging and disengaging means and connected thereto for determining the effectivity of said engaging and disengaging means upon operation of said common member, and a plurality of special manipulative devices for controlling said pivoted member.

14. In a machine of the class described, the combination of a plurality of totalizers; item entering means; a common actuator for the totalizers and normally disengaged therefrom; means for engaging one totalizer with the actuator and for disengaging it therefrom; means for engaging the other totalizer with the actuator and for disengaging it therefrom; a rockable member common to the item entering means and operated thereby; a device carried by said member and having a plurality of projections, one projection being adapted to operate one totalizer engaging and disengaging means, and another projection being adapted to operate the other totalizer engaging and disengaging means; and manually operated means to determine which projection shall be effective.

In testimony whereof we affix our signatures.

FREDERICK L. FULLER.
WILLIAM H. ROBERTSON.